United States Patent Office 3,770,828
Patented Nov. 6, 1973

---

3,770,828
SUBSTITUTED 3-PHENYLINDAN-1-ONE OXIMES
James M. Berdahl, Evansville, Ind., assignor to Mead
Johnson & Company, Evansville, Ind.
No Drawing. Filed Oct. 20, 1967, Ser. No. 676,714
Int. Cl. C07c 131/00
U.S. Cl. 260—566 A                    5 Claims

ABSTRACT OF THE DISCLOSURE

3 - (2 - dimethylaminoethyl)-3-phenylindan-1-one oxime prepared by alkylation of the disodium salt of 3-phenylindan-1-one oxime with dimethylaminoethyl chloride is identical with the oxime prepared from 3-(2-dimethylamino-ethyl)-3-phenylindan-1-one. The oxime has strong antireserpine action.

---

The present invention provides the new pharmacologically active compounds 3-(2-methylaminoethyl)-3-phenylindan-1-one oxime, 3-(2-dimethylaminoethyl)-3-phenylindan-1-one oxime, a novel means for synthesizing the latter, and the non-toxic acid addition salts of these substances. These substances have strong antireserpine activity which characterizes them as antidepressants. They have the following structural formula.

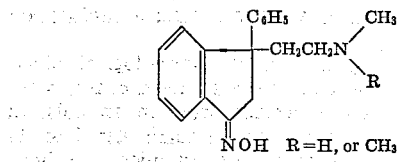

$R=H$, or $CH_3$

The compounds of the present invention are prepared from 3-(2-methylamino- or 2-dimethylaminoethyl)-3-phenylindan-1-one by reaction with hydroxylamine in conventional fashion for the preparation of oximes. The reaction is preferably conducted under basic conditions, for example using the aminoalkyl indanone base, and hydroxylamine base, in a reaction inert solvent such as water or a lower alkanol.

The aminoalkyl indanone intermediates are also part of the present invention. They are biologically active in animals in the phenylquinone writhing and formalin edema tests comparable to aspirin. A suitable method of preparation involves condensation of the disodium or dipotassium salt of 3-phenylindan-1-one with dimethylaminoethyl chloride to yield 3-(2-dimethylaminoethyl)-3-phenylindan-1-one by adaptation of the method of Rockett & Hauser, J. Org. Chem. 29, 1394 (1964) for benzylation of 3-phenylindan-1-one. That substance is demethylated to 3 - (2 - methylaminoethyl) - 3 - phenylindan-1-one by reaction with ethyl chloroformate or benzyl chloroformate and hydrolysis of the intermediate carbamate ester.

DESCRIPTION OF SPECIFIED EMBODIMENTS (a) 3-(2-dimethylaminoethyl)-3-phenylindan-1-one hydrochloride.—Sodium amide is prepared by reacting 4.6 g. (0.2 gm. atoms) of sodium with 500 ml. of liquid ammonia. A crystal of ferric nitrate is added to catalyze the formation of the sodium amide. 3-phenylindan-1-one, 20.8 g. (0.1 mole) dissolved in 20 ml. of ether is then added dropwise to the suspension of sodium amide in liquid ammonia. The cooling bath is removed, and the liquid ammonia is permitted to evaporate. The suspension of the disodium salt of 3-phenylindan-1-one in ether is then diluted with 200 ml. of benzene and treated with a few crystals of potassium iodide and a solution of 10.8 g. (0.1 mole) of 2-dimethylaminoethyl chloride dissolved in 23 ml. of xylene and 75 ml. of benzene. The reaction is concluded by heating the mixture at 55–60° C. for 1 hr. and stirring overnight at room temperature. The resulting sodium salt of the reaction product is hydrolyzed by treatment of the reaction mixture with an equal volume of water. The benzene layer is separated and extracted with dilute aqueous hydrochloric acid. The acidic extract is then basified with sodium hydroxide, resulting in the precipitation of the indanone intermediate as an oil. The oil is extracted into ether and the ether solution, after drying, is acidified with 6 N isopropanolic hydrogen chloride, resulting in precipitation of the desired product as the hydrochloride salt. This material is purified by recrystallization from ethanol; yield, 14.6 g. (46%), M.P. 242–244° C. (dec.). A small sample further purified for analysis by recrystallization from acetone-ethanol exhibited M.P. 245.5–246.5° C.

Analysis.—Calcd. for $C_{19}H_{21}NO \cdot HCl$ (percent): C, 72.26; H, 7.02; Cl, 11.23. Found (percent): C, 72.37; H, 7.17; Cl, 11.41.

The nuclear magnetic resonance spectrum of the product of Example (a) was measured on a deuterium oxide solution of this material using sodium-3-(trimethylsilyl)-1-propanesulfonate as reference. A Varian A–60 instrument operatnig at 60 mc. was employed. The following chemical shifts were observed: a broad peak centering at 2.8 p.p.m. relative area 6 ($CH_2$ protons); a sharp singlet at 2.82 p.p.m., relative area 6 ($N(CH_3)_2$ protons); 7.23 p.p.m., relative area 5 (monosubstituted phenyl protons); 7.6 p.p.m., relative area 4 (indane aromatic protons).

(b) 3-(2-dimethylaminoethyl) - 3 - phenylidan-1-one oxime by hydroxylamine reaction.—3-(2-dimethylaminoethyl)-3-phenylindan-1-one hydrochloride, 8 g. (0.025 mole) is converted to the base by dissolving in 90 ml. of water and treating with 10 ml. of 10% aqueous sodium hydroxide. The base precipitates as a gum which is extracted into ether. The ether solution is dried over magnesium sulfate and the solvent is removed by distillation, yielding the base as a pale yellow oil. A solution of hydroxylamine is prepared by dissolving 3.5 g. (0.05) mole) of hydroxylamine hydrochloride in 20 ml. of water and basifying with 10% aqueous sodium hydroxide. Sufficient ethanol is added to provide a clear solution, and the resulting solution is mixed with the foregoing pale yellow oil. The mixture is warmed on a steam bath for 10 min., and then diluted with 75 ml. of water. The product precipitates as a gum which is recovered by decanting the supernatant liquid. It is crystallized by trituration with ethyl acetate; yield, 4.2 g. (58%). This material is recrystallized from 85 ml. of ethyl acetate; yield, 2.7 g., M.P. 167–170° C. (corr.).

Analysis.—Calcd. for $C_{19}H_{22}N_2O$ (percent): C, 77.51; H, 7.53; N, 9.52. Found (percent): C, 77.28; H, 7.44; N, 9.41.

(c) 3-(2-methylaminoethyl) - 3-phenylindan - 1-one oxime.—This material is prepared in a fashion analagous to Example (b) with substitution of 3-(2-methylaminoethyl)-3-phenylindan-1-one as starting material.

An alternate method for the preparation of the dimethylaminoethyl oxime of Example (b) is by the direct alkylation of 3-phenylindan-1-one oxime with dimethylaminoethyl chloride or an equivalent reactive ester such as the bromide, iodide, alkylsulfonate such as the mesylate, or arylsulfonate such as the tosylate, by a procedure similar to that of Example (a). This process is chemically novel in that carbon alkylation of an oxime in this fashion has not been previously described. This is the preferred process for preparation of the valuable product of this invention.

The disodium or dipotassium salt of 3-phenylindan-1-one oxime is first prepared by reaction of the oxime with sodium or potassium amide in liquid ammona. The volume of liquid ammonia employed is not critical and is selected for convenience with reference to the size of the batch and of the equipment available. The sodium or potassium amide may be prepared in situ by reaction of the metal with liquid ammonia, using a crystal of ferric nitrate to catalyze the reaction, or commercially available sodium amide or potassium amide may be employed.

The oxime dimetallo salt is formed by addition of a suspension of the oxime in ether or other reaction inert organic solvent to the liquid ammonia solution of the metal amide. Formation of the dimetallo salt of the oxime is spontaneous. The reaction is then completed by adding a solution of dimethylaminoethyl chloride in a reaction inert solvent such as benzene, toluene, xylene, or ether to the ether suspension of the disodium salt and warming the mixture for a short time to insure completion of the reaction. Warming is probably not essential since the reaction between the aminoalkyl halide and the oximinodimetallo salt is spontaneous and takes place on contact. The reaction takes place at temperatures as low as −60° C. up to elevated temperatures of the order of 60 to 100° C. Use of liquid ammonia under conditions where it is permitted to evaporate is convenient since the ammonia provides an inert atmosphere. The reacton is adversely affected by moisture or atmospheric carbon dioxide and oxygen.

For recovery of the product, the sodium or potassium salt thereof which is produced by the foregoing reaction is neutralized or hydrolyzed by contacting with dilute acid or water. The hydrochloride or other acid addition salt may be formed at this stage if desired, by proper selection of aqueous acid for neutralization of the intermediate sodium or potassium salts. Alternatively the product may be recovered in the amphoteric form by decomposition of the intermediate metal salt with water. The latter is illustrated by the following example.

(d) 3-(2 - dimethylaminoethyl)-3-phenylindan-1-one oxime by alkylation.—Sodium amide is prepared by reacting 5.75 g. (0.25 gm. atom) of sodium with liquid ammonia using a few crystals of ferric nitrate as catalyst. One liter of liquid ammonia is used. After the blue color of dissolved sodium has disappeared, a slurry of 3-phenylindan-1-one oxime, 22.3 g. (0.1 mole) in 200 ml. of ether is added during a period of 1 hr. The mixture is stirred for 1.5 hrs. to ensure formation of the disodium salt of the oxime and then a solution of 16.2 g. (0.15 mole) of 2-dimethylaminoethyl chloride in 100 ml. of ether and 15 ml. of xylene is added during the course of a further 1 hr. period. The mixture is stirred at room temperature until excess liquid ammonia evaporates. The reaction mixture is diluted with 100 ml. of ether and then extracted with 100 ml. of water. The aqueous layer is washed with ether and combined ether layers are dried over magnesium sulfate and concentrated to a dry residue which solidifies. The residue is triturated with ether and then collected on a filter; weight, 21 g. (71.6%). This material is recrystalized from 200 ml. of ethyl acetate and 75 ml. of absolute ethanol, yield 13.9 g. (47%). This material is identical with that described in Example (b).

The nuclear magnetic resonance spectrum of the product of Example (d) was recorded on a Varian A60 NMR Spectrometer using chloroform-d as solvent and tetramethylsilane as internal standard. The following chemical shifts, which are confirmatory of the structure, were observed: a singlet at 2.22 p.p.m., relative area 6 ($N(CH_3)_2$ protons); a broad multiplet centered at 2.28 p.p.m., relative area 4 (side chain aliphatic protons); a singlet at 3.25 p.p.m., relative area 2, (indane aliphatic protons); a broad multiplet centered at 7.25, p.p.m., relative area 8 (aromatic protons); a multiplet at 7.72 p.p.m., relative area 1 (indane aromatic proton at 7-position); and a broad singlet at 10.12 p.p.m., relative area 1 (oxime proton).

(e) 3-(2-dimethylaminoethyl) - 3 - phenylidene-1-one oxime hydrochloride.—A solution of 5 g. of the oxime described in Example (d) is dissolved in 70 ml. of 95% ethanol. Heating is required to effect solution. Somewhat in excess of one molecular proportion of ethanolic hydrogen chloride is then added to the warm solution followed by a sufficient quantity of isopropyl ether to produce a slight turbidity. The mixture is then cooled to room temperature and the product collected on a filter. It is a white crystalline solid which is dried in a vacuum oven, M.P. 258–259° C. (dec.); yield 4.4 g. (79%).

Analysis.—Calcd. for $C_{19}H_{22}N_2O \cdot HCl$ (percent): C, 68.96; H, 7.00; N, 8.46. Found (percent): C, 69.02; H, 7.16; N. 8.42. The infrared and nuclear magnetic resonance spectra measured on this sample were consistent with the assumed structure.

Other pharmacologically acceptable acid addition salts may be prepared by the foregoing procedure by substitution of at least 1 chemical equivalent of the following acids with respect to the 3-(2-dimethylaminoethyl)-3-phenylindene-1-one oxime: hydrobromic, hydroiodic, acetic, propionic, benzoic, phosphoric, nitric, succinic, gluconic, mucic, sulfuric, methanesulfonic, ethanesulfonic, p-toluenesulfonic, citric, tartaric, pamoic, and tannic acids. The term pharmacologically acceptable acid addition salt refers to those salts of a compound of the present invention in which the anion does not contribute significantly to the toxicity thereof in the doses in which they are administered for pharmacological effect.

Pharmacology

The oxime compounds of this invention are equivalent to or somewhat more potent than imipramine in antidepressant effect observed in mammals. They are relatively non-toxic and essentially devoid of central nervous system stimulating and anticholinergic actions at effective antidepressant doses of 0.2 to 50 mg./kg. of body weight of the mammalian host. Oral or parenteral administration may be employed.

The ability to antagonize various physiological effects of reserpine in mice is a generally accepted criterion for the comparison of antidepressant drugs in animals. In this test, a dose of test compound is administered orally to each mouse of several groups of test mice. One hour later 2.0 mg./kg. of reserpine is injected intravenously, and 1 hr. following that ptosis is measured by placing each mouse on a platform away from light and estimating the extent of closure of the palpebral fissure. The foregoing dose of reserpine will reduce the opening from 50 to 100%. The reserpine effect is considered to be significantly modified if the opening in reserpine-treated mice receiving the test drug is greater than 50%. Various doses of test compound are administered to different groups of mice and the dose effective to antagonize the reserpine action in 50% of the animals is calculated from a dose response curve. In this fashion the $ED_{50}$ value determined for 3-(2-dimethylaminoethyl)-3-phenylindan-1-one oxime in repeated experiments is within the range 3.6 to 6.4 mg./kg. The $ED_{50}$ value for imipramine in this test is 6.5 mg./kg. and for amitryptyline, another well-known antidepressant drug, 12.5 mg./kg.

In normal mice which have not been treated with reserpine, 3-(2-dimethylamino) - 3 - phenylindan-1-one oxime produces no symptoms whatever when administered orally in doses of 50 mg./kg. At a dose of 100 mg./kg. orally, only minor symptoms are observed, including a slight reduction in motor activity and moderate ataxia. No deaths occur. The lethal dose has not been precisely determined, but the $ALD_{50}$ is in excess of 100 mg./kg. but is probably less than 250 mg./kg. in mice treated orally. Doses of up to 100 mg./kg. of body weight administered intraperitoneally to mice are also well tolerated. No deaths or convulsions occur.

The lack of stimulant action in mice treated with 3-(2-dimethylamino) - 3 - phenylindan-1-one oxime is evident from the foregoing toxicity studies. A more sophisticated evaluation of stimulant action involves measurement of the compound's capacity to antagonize benzoquinolizine suppression of a conditioned avoidance response in rats according to the method of Sulser, Watts, and Brodie, N.Y. Acad. Sci. 96, 79 (1962). The benzoquinolizine RO 4–1284 (2 - ethyl-1,3,4,6,7,11b-hexahydro-3-isobutyl-9,10-dimethoxy-2H,benzo[a]quinolizin-2-ol) causes depression in rats similar to reserpine. A dose of 1 mg./kg. of this substance administered intraperitoneally to rats trained to avoid an electrical foot shock in a test apparatus results in failure to avoid the shock in accordance with previous training. Stimulants such as amphetamine administered subcutaneously after the benzoquinolizine depression has been induced reverses the depressant effect and restores the animal's ability to avoid the foot shock. Antidepressant drugs such as imipramine fail to reverse the depression. The compound of the present invention was tested at 80 mg./kg. subcutaneously. It failed to reverse the depressant effect of benzoquinolizine. This result, in combination with the measurement of anti-reserpine action referred to above, is convincing evidence of the substance's antidepressant action without complication thereof by conventional CNS stimulant effects.

While several particular embodiments of this invention are shown above, it will be understood, of course, that the invention is not to be limited thereto, since many modifications may be made, and it is contemplated, therefore, by the appended claims to cover any such modifications as fall within the true spirit and scope of this invention.

What is claimed is:

1. The compound having the formula

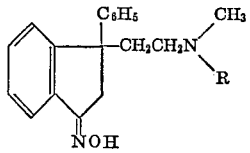

in which R is hydrogen or methyl or salts thereof with pharmaceutically acceptable acids.

2. The compound of claim 1 wherein R is hydrogen which is known by the chemical name 3-(2-methylaminoethyl)-3-phenylindan-1-one oxime.

3. The compound of claim 1 wherein R is $CH_3$ which is known by the chemical name 3-(2-dimethylaminoethyl)-3-phenylindan-1-one oxime.

4. The hydrochloride salt of the compound of claim 3.

5. 3-[2-(dimethylamino)ethyl]-3-phenylindan-1-one.

References Cited

UNITED STATES PATENTS

| | | | |
|---|---|---|---|
| 3,504,031 | 3/1970 | Berdahl et al. | 260—570.8 |
| 3,410,902 | 11/1968 | Draper | 260—570.8 |
| 3,282,948 | 11/1966 | Draper | 260—294.7 |

OTHER REFERENCES

Rockett et al.: J. Org. Chem., vol. 29, pp. 1394–97 (1964).

Dykstra et al.: Journal of Medicinal Chemistry, vol. 10, pp. 418–428 (May 1967).

BERNARD HELFIN, Primary Examiner

G. A. SCHWARTZ, Assistant Examiner

U.S. Cl. X.R.

260—501.1, 501.17, 501.19, 570.8 R; 424—327

UNITED STATES PATENT OFFICE
CERTIFICATE OF CORRECTION

Patent No. 3,770,828          Dated November 6, 1973

Inventor(s) James M. Berdahl

It is certified that error appears in the above-identified patent and that said Letters Patent are hereby corrected as shown below:

Col. 1, l. 55     -     "specified" should be
                                -- specific --

Col. 1, l. 62     -     "20 ml." should be
                                -- 200 ml. --

Col. 3, l. 49     -     before "combined" insert
                                -- the --

Col. 6, l. 1
      (CLAIM 1)       -     after "methyl" insert a comma -- , --

Signed and sealed this 23rd day of April 1974.

(SEAL)
Attest:

EDWARD M. FLETCHER, JR.          C. MARSHALL DANN
Attesting Officer                  Commissioner of Patents